(12) United States Patent
Small

(10) Patent No.: US 7,564,481 B2
(45) Date of Patent: *Jul. 21, 2009

(54) PRINTER PARAMETER COMPENSATION BY A HOST CAMERA

(75) Inventor: Jeffrey Alan Small, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 877 days.

This patent is subject to a terminal disclaimer.

(21) Appl. No.: 11/119,717

(22) Filed: May 2, 2005

(65) Prior Publication Data

US 2005/0190265 A1  Sep. 1, 2005

Related U.S. Application Data

(63) Continuation of application No. 08/833,106, filed on Apr. 4, 1997, now Pat. No. 6,940,541.

(51) Int. Cl.
*H04N 5/225* (2006.01)
(52) U.S. Cl. .................................... 348/207.2
(58) Field of Classification Search ............... 348/581, 348/582, 583; 358/500, 501, 502, 503, 504, 358/515, 523, 448, 449, 451, 445, 450; 399/130, 399/131, 144, 151
See application file for complete search history.

(56) References Cited

U.S. PATENT DOCUMENTS

| | | | |
|---|---|---|---|
| 4,161,749 A | 7/1979 | Erlichman | |
| 4,827,347 A | 5/1989 | Bell | |
| 4,937,676 A | 6/1990 | Fineli et al. | |
| 4,942,477 A | 7/1990 | Nakamura | |
| 4,952,951 A | 8/1990 | Kumasaka et al. | |
| 5,027,148 A * | 6/1991 | Anagnostopoulos | 396/96 |
| 5,040,068 A | 8/1991 | Parulski et al. | |
| 5,138,459 A | 8/1992 | Roberts et al. | |
| 5,237,401 A | 8/1993 | Koike et al. | |
| 5,319,403 A * | 6/1994 | Sakamoto et al. | 396/311 |
| RE34,654 E | 7/1994 | Yamawaki | |
| 5,384,646 A | 1/1995 | Godshalk et al. | |

(Continued)

FOREIGN PATENT DOCUMENTS

EP  0 405 470 A2  1/1991

(Continued)

*Primary Examiner*—Tuan V Ho
*Assistant Examiner*—Akshay Trehan
(74) *Attorney, Agent, or Firm*—Mark G. Bocchetti; David A. Novais

(57) ABSTRACT

A system wherein already-existing computing and memory resources in an electronic camera are used to process an image for printing. Rather than duplicating, in printers, computing and memory resources that are already in digital cameras, significant computing and memory resources need exist only in the camera. A digital camera can support many different printers, each with its own set of parameters such as for example print size, pixel size, colorimetry, sensitometry, and artifacts compensation. Printer parameters are uploaded from the printer to the camera to provide a basis for image processing specific to the associated printer; whereby compensation may be done for variations in the printer characteristics which may occur as a result of printer manufacturing variations, and further so that compensation may be done for different media types which may be installed in the printer.

8 Claims, 3 Drawing Sheets

U.S. PATENT DOCUMENTS

| | | |
|---|---|---|
| 5,461,459 A | 10/1995 | Muramatsu et al. |
| 5,499,113 A | 3/1996 | Tsuboi et al. |
| 5,563,655 A | 10/1996 | Lathrop |
| 5,717,839 A | 2/1998 | Ichikawa |
| 5,721,620 A | 2/1998 | Arai et al. |
| 5,754,184 A | 5/1998 | Ring et al. |
| 5,781,315 A | 7/1998 | Yamaguchi |
| 5,812,243 A | 9/1998 | Waibel et al. |
| 6,108,008 A | 8/2000 | Ohta |

FOREIGN PATENT DOCUMENTS

| | | |
|---|---|---|
| EP | 0 675 648 A2 | 10/1995 |

* cited by examiner

PRINTER PARAMETER COMPENSATION BY A HOST CAMERA

CROSS REFERENCE TO RELATED APPLICATIONS

This is a continuation of continued prosecution application U.S. Ser. No. 08/833,106, filed Apr. 4, 1997 now U.S. Pat. No. 6,940,541, which is a continued prosecution application of U.S. Ser. No. 08/833,106 filed Sep. 20, 1999, which is a continued prosecution application of U.S. Ser. No. 08/833, 106, filed Apr. 4, 1997.

FIELD OF THE INVENTION

The present invention relates to digital cameras and associated printers for producing hardcopy images captured by such cameras.

BACKGROUND OF THE INVENTION

Typically, images captured by digital cameras must be processed before they are printed. This processing is carried out in the printer. Significant computing and memory resources are required to process an image for printing. Accordingly, the printer must be provided with expensive computing and memory resources. One solution known in the prior art is to provide access to a stand-alone computer that is connectable to both the camera and the printer, either directly or by portable memory. This solution is inappropriate when the printer is to be used in remote locations distanced from the computer.

DISCLOSURE OF THE INVENTION

According to a feature of the present invention, I have come to appreciate that computing and memory resources, which already exist in electronic cameras in order for the camera to capture, process, compress, and store images, can be used to provide the computing and memory resources that are required to process an image for printing.

It is an object of the present invention to provide a system wherein already-existing computing and memory resources in an electronic camera are used to process an image for printing. This is possible because the existing computing and memory resources are otherwise generally idle during the printing stage. Accordingly, it is a feature of the present invention that, rather than duplicating, in printers, computing and memory resources that are already in digital cameras, the present invention provides for camera and printer systems wherein significant computing and memory resources need exist only in the camera. Because such resources are already required by the camera in order to perform the camera functions, the cost of the camera is not increased. Because the resources are no longer required in the printer, the overall system cost is greatly reduced.

It is another object of the present invention to provide a digital camera that can support many different printers, each with its own set of parameters such as for example print size, pixel size, colorimetry, sensitometry, and artifacts compensation. Accordingly, it is a feature of the present invention to provide for uploading printer parameters from the printer to the camera to provide a basis for image processing specific to the associated printer; whereby compensation may be done for variations in the printer characteristics which may occur as a result of printer manufacturing variations, and further so that compensation may be done for different media types which may be installed in the printer.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

DETAILED DESCRIPTION OF THE INVENTION

The present description will be directed in particular to elements forming part of, or cooperating more directly with, apparatus in accordance with the present invention. It is to be understood that elements not specifically shown or described may take various forms well known to those skilled in the art.

Figure 1:
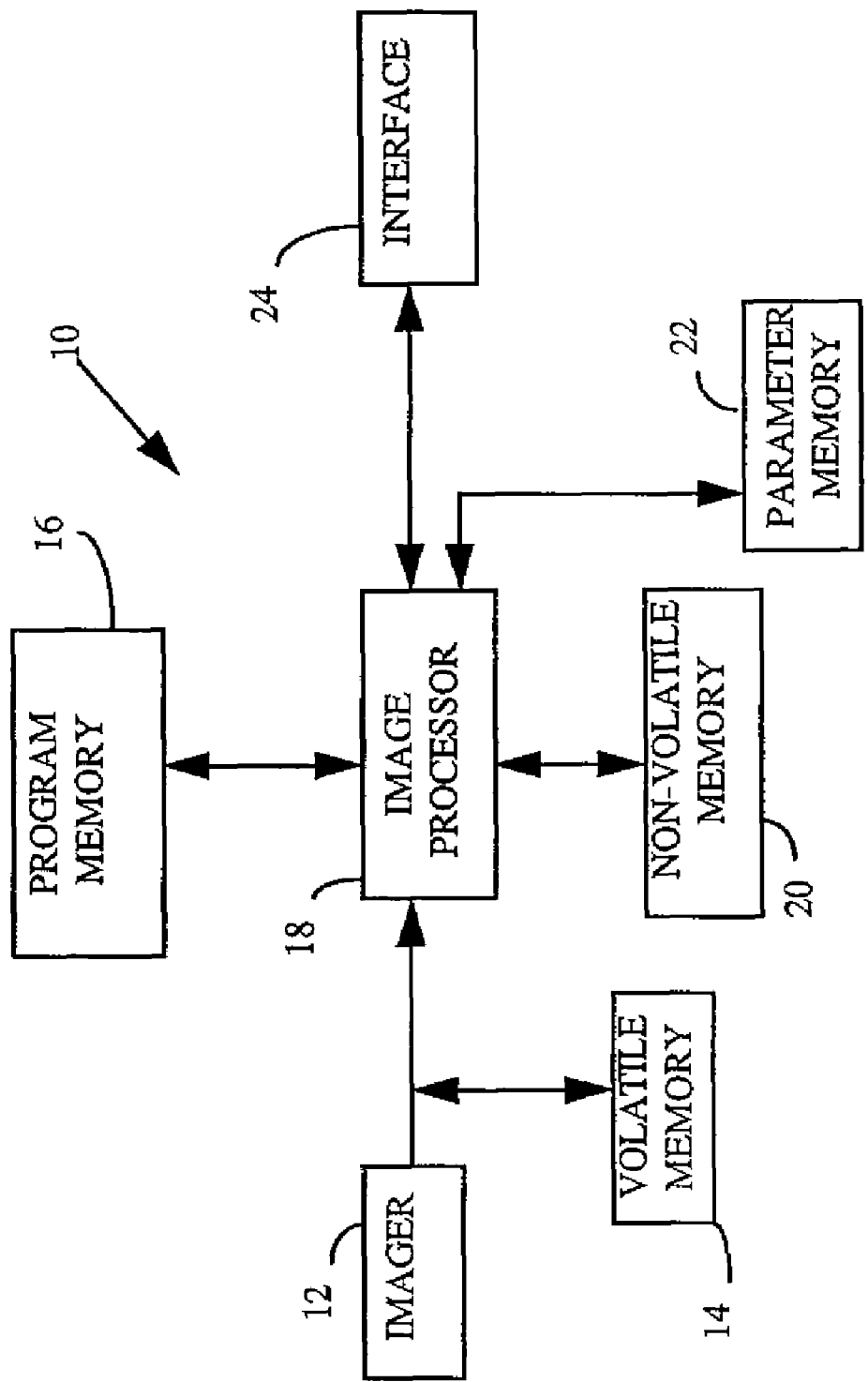
FIG. 1 is a schematic block diagram of a digital camera according to the present invention.

Referring to FIG. 1, a digital camera 10 provides significant image processing and memory resources to capture, process, compress, and store images. An imager 12 includes an array of image sensors. Conventionally, a complete image frame is available in digital form from imager 12, only for a short time interval. Thus, the captured image is temporarily stored in raw form in a volatile memory 14. Various image processing algorithms are stored in a program memory 16, and are executed by an image processor 18 in order to process the image data stored in volatile memory 14. For example, the image processing algorithms may include all or some of the processes of image sensor tone scale compensation, color filter array interpolation, color space transformation, re-sizing, spatial filtering, and compression. The resulting processed image data is then typically stored in a nonvolatile memory 20.

This stored image must be further processed prior to printing. Such further processing may include some or all of the steps of decompression, color space transformation into color planes that coincide with the process colors of the particular printer re-sizing, rotation, and compensation for the printing process. In prior art systems, this further processing has been effected by computing and memory resources in the printer or in a stand-alone computer. According to the present invention, this further processing is performed using the resources which are already in camera 10. It is advantageous to perform all of the processing using the resources in camera 10 in order to avoid the additional expense of including similar resources in the printer. To effect such image processing in camera 10, the camera is provided with a parameter memory 22 and a printer interface 24, both to be further described hereinafter.

Figure 2:
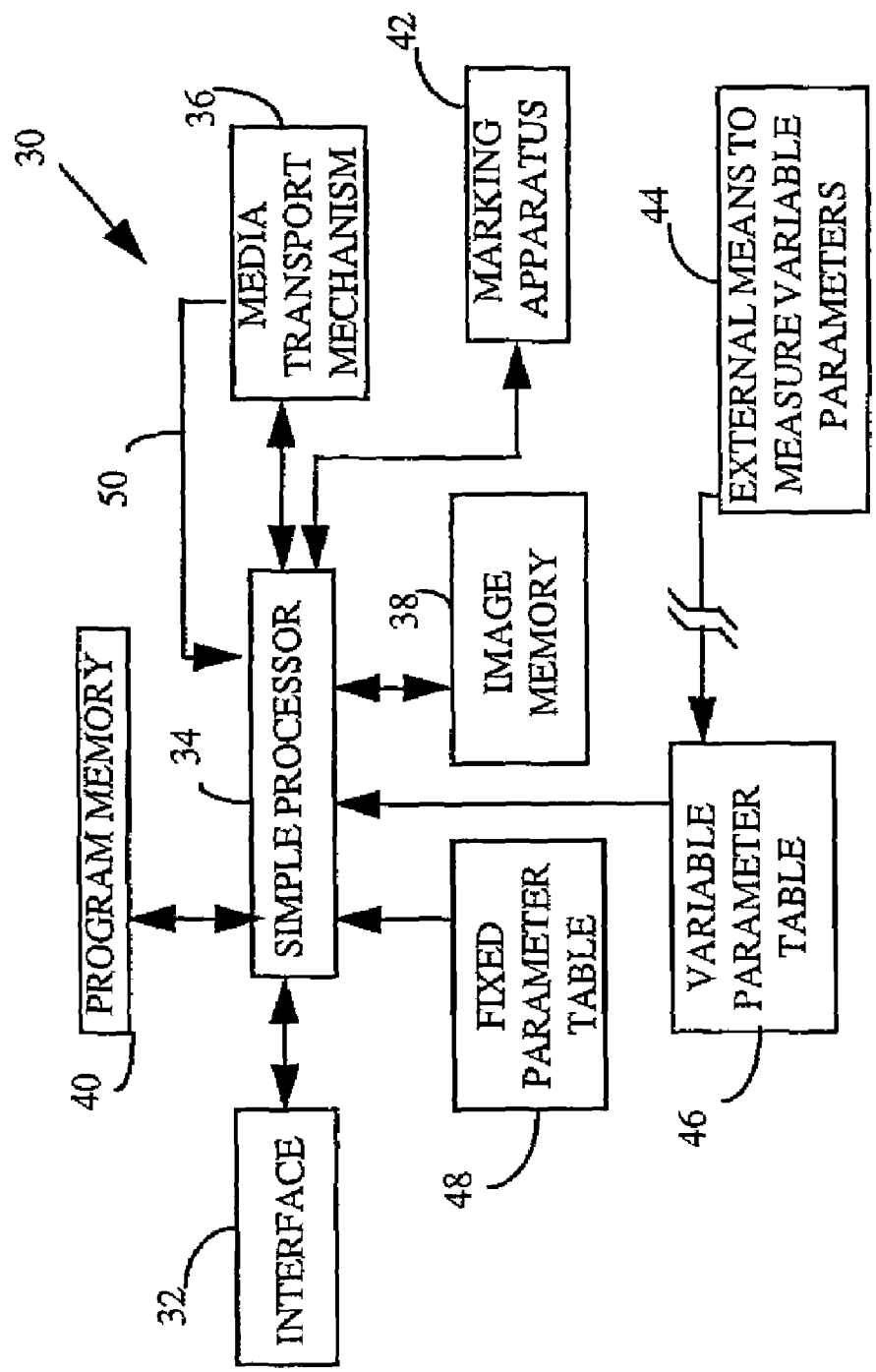
FIG. 2 is a schematic block diagram of a digital printer according to the present invention.

Referring to FIG. 2, a printer 30 includes a camera interface 32, an inexpensive simple processor 34, a media transport mechanism 36, an image memory 38, a program memory 40, and a marking apparatus 42. A processed image, received from camera 10 of FIG. 1 via interface 32, may be stored by printer 30 in image memory 38 for subsequent printing by marking means 42 under the control of simple processor 34 and a program stored in program memory 40, or the processed image may be printed immediately. Simple processor 34 need not be capable of executing printer compensation algorithms.

Parameters which may vary as a result of manufacturing variations in the printer may be measured by an external means 44 at the time of manufacture. Said parameters may then be stored in a variable parameter table 46 which is part of the printer. Camera 10 may query printer 30 to establish whether the printer will perform compensation for the variable parameters, or whether the camera should request and accept the variable parameters from the printer, and subsequently perform compensation for said variable parameters. The printer provides both fixed parameters from a fixed parameter table 48 and variable parameters from its variable parameter table 46 to the camera by means of camera and printer interfaces 24 and 32, respectively. The camera stores these parameters in local parameter memory 22.

When an image in either volatile memory 14 or nonvolatile memory 20 is selected for printing, image processor 18 processes said selected image using the fixed and variable parameters which are stored in parameter memory 22, and transmits the processed image to the printer by means of the interfaces 24 and 32. Processing may include all or part of the operations of image sensor tone scale compensation, color filter array interpolation, decompression, color space transformation, re-sizing, rotation, cropping, spatial filtering, and compensation for the printing process, but is not limited to these specific operations.

In addition, parameters which can vary during printing may also be transmitted by the printer to the camera during the printing process and used by image processor 18 to further compensate the image for printing process variations during the printing operation. The parameters may include temperature, ink viscosity, measured density, and any other parameters which are known to vary with the specific printing process employed by the printer.

Further, parameters characteristic of particular media material at media transport mechanism 36 may be determined by simple processor 34 over an interface 50 and transmitted to the camera. The media parameters may include parameters which vary with media type and parameters which vary between different batches of media due to manufacturing variations. Thus, compensation for the media parameters may be done by image processor 18 in the camera.

Figure 3:
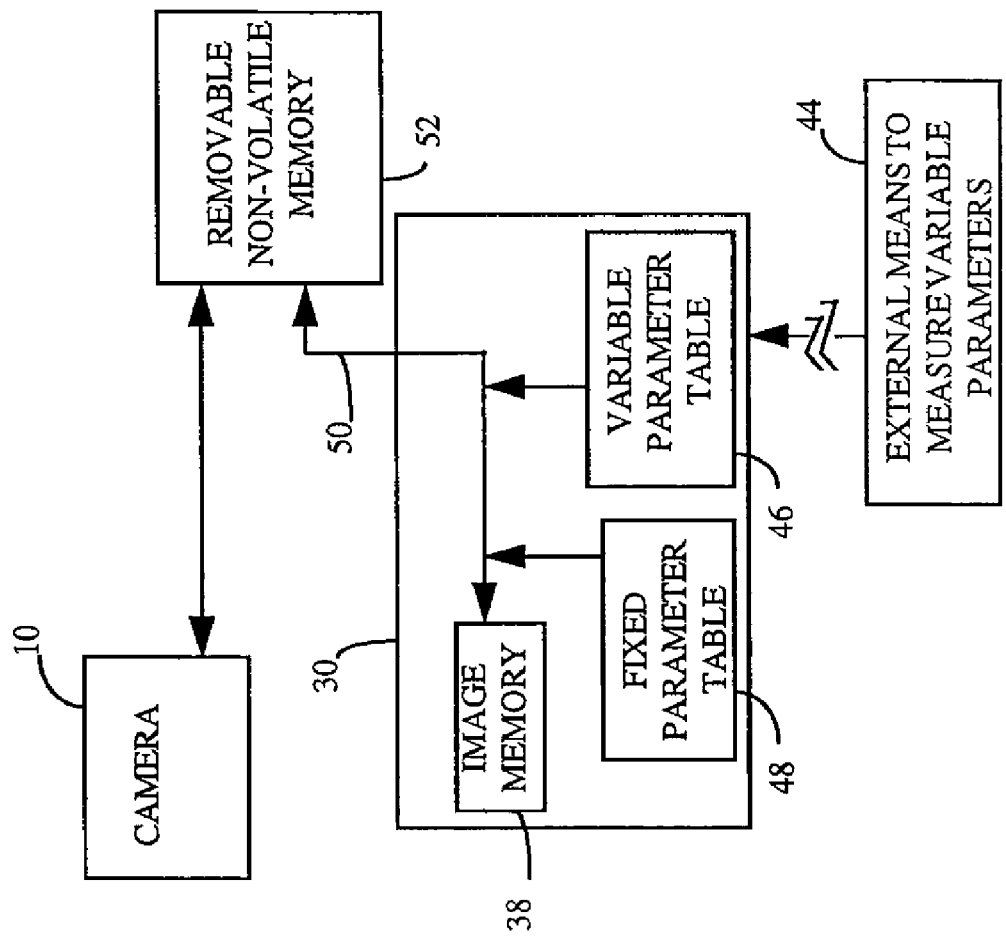
FIG. 3 is a schematic block diagram of a camera-printer system according to another embodiment of the present invention.

Any such media parameters, fixed parameters, and variable parameters may be transferred from printer 30 to camera 10 by means of a removable non-volatile memory cartridge 52 shown in FIG. 3. The memory cartridge may also be used to transfer images between the camera and the printer. As used herein, the phrases "camera interface and printer interface" are intended to include cable connections, transferable memory, radiation transmission (light, microwave, infrared, etc.), and other forms of information transfer between components.

The invention has been described in detail with particular reference to preferred embodiments thereof, but it will be understood that variations and modifications can be effected within the spirit and scope of the invention.

The invention claimed is:

1. A digital imaging system comprising:
a digital camera for capturing images and a digital printer for producing prints of the captured images,
the digital camera including:
an image sensor for capturing images and producing raw image data;
an image processor for executing a first plurality of image processing algorithms in order to process the raw image data to produce first processed image data, the first plurality of image processing algorithms including color filter array interpolation and compression;
a nonvolatile memory for storing the first processed image data;
a printer interface for directly connecting the digital camera to the digital printer to enable the digital camera to receive printer parameters identifying a print size from the digital printer and to provide second processed image data to the digital printer; and
a parameter memory for storing the printer parameters identifying the print size received from the digital printer; and
the digital printer including:
a media transport mechanism and a marking apparatus for producing a print using process colors;
a memory for storing the printer parameters identifying the print size;
a processor for controlling the media transport mechanism and the marking apparatus, the processor being coupled to the memory to read the stored printer parameters; and
a camera interface coupled to the processor, for providing the printer parameters identifying the print size to the digital camera and for receiving the second processed image data from the digital camera; and
wherein the image processor in the digital camera executes a second plurality of image processing algorithms in order to produce the second processed image data, the second plurality of stored image processing algorithms to perform decompression and print re-sizing responsive to the printer parameters identifying the print size stored in the parameter memory.

2. A digital imaging system as recited in claim 1 wherein:
the digital camera is a portable, hand-held digital image capture device which captures original digital images of objects at varying distances and in variable ambient light conditions.

3. The digital imaging system as set forth in claim 1 wherein the camera interface and the printer interface are provided using a cable connection.

4. The digital imaging system as set forth in claim 1 wherein the camera interface and the printer interface are provided using infrared transmission.

5. The digital imaging system as recited in claim 1 wherein the printing parameters further allow for compensation for printing temperature variations.

6. The digital imaging system as recited in claim 1 wherein the printing parameters further allow for compensation for ink viscosity variations.

7. The digital imaging system as recited in claim 1 wherein the second printing parameters allow for compensation for manufacturing variations of a particular media type.

8. The digital imaging system as recited in claim 1 wherein the printing parameters further compensate for printing process variations determined when the digital printer is manufactured.

* * * * *

UNITED STATES PATENT AND TRADEMARK OFFICE
CERTIFICATE OF CORRECTION

PATENT NO. : 7,564,481 B2
APPLICATION NO. : 11/119717
DATED : July 21, 2009
INVENTOR(S) : Jeffrey A. Small It is certified that error appears in the above-identified patent and that said Letters Patent is hereby corrected as shown below:

Column 1, line 6-12   Delete "This is a continuation of continued prosecution application U.S. Ser. No. 08/833,106, filed Apr. 4, 1997 now U.S. Pat. No. 6,940,541, which is a continued prosecution application of U.S. Ser. No. 08/833,106 filed Sep. 20, 1999, which is a continued prosecution application of U.S. Ser. No. 08/833,106, filed Apr. 4, 1997." and
insert -- This is a continuation of application US Serial No. 08/833,106, filed April 4, 1997, now U.S. Patent 6,940,541 --, therefor.

Signed and Sealed this

Fifth Day of January, 2010

David J. Kappos
*Director of the United States Patent and Trademark Office*